United States Patent [19]

Kurosawa

[11] Patent Number: 4,926,266
[45] Date of Patent: May 15, 1990

[54] METHOD OF DECODING IN RUN REPRESENTATION

[75] Inventor: Yoshiaki Kurosawa, Kanagawa, Japan

[73] Assignee: Kabushiki Kaisha Toshiba, Kanagawa, Japan

[21] Appl. No.: 246,117

[22] Filed: Sep. 16, 1988

[30] Foreign Application Priority Data

Sep. 21, 1987 [JP] Japan .................. 62-234779

[51] Int. Cl.$^5$ ............................. H04N 1/419
[52] U.S. Cl. .................. 358/426; 358/261.1; 382/56
[58] Field of Search ............ 358/260, 426, 261.4, 358/427, 261.1, 261.2; 382/56

[56] References Cited

U.S. PATENT DOCUMENTS

| | | | |
|---|---|---|---|
| 4,117,517 | 9/1978 | Shintani et al. | 358/260 |
| 4,121,259 | 10/1978 | Preuss et al. | 358/261.1 |
| 4,134,133 | 1/1979 | Teramura et al. | 358/260 |
| 4,590,521 | 5/1986 | Rallapalli et al. | 358/261.1 |
| 4,596,039 | 6/1986 | Mitchell et al. | |
| 4,610,027 | 9/1986 | Anderson et al. | |
| 4,646,356 | 2/1987 | Anderson et al. | |
| 4,800,441 | 1/1989 | Sato | 358/260 |

FOREIGN PATENT DOCUMENTS

0036073 3/1983 Japan .

Primary Examiner—Howard W. Britton
Assistant Examiner—Kim Yen Vu
Attorney, Agent, or Firm—Finnegan, Henderson, Farabow, Garrett and Dunner

[57] ABSTRACT

An improved method of decoding in run representation. This method includes the steps of retrieving in response to position information or length information at least one predetermined word pattern containing a plurality of bits arranged in a predetermined bit pattern from a plurality of stored word patterns, each having a different predetermined bit pattern, and processing the retrieved word pattern using OR/Exclusive OR processing to output bit pattern data corresponding to a word unit portion of the original image.

14 Claims, 10 Drawing Sheets

| ADDRESS | WORD PATTERN |
|---|---|
| 1 | 0 1 1 1 1 1 1 1 |
| 2 | 0 0 1 1 1 1 1 1 |
| 3 | 0 0 0 1 1 1 1 1 |
| 4 | 0 0 0 0 1 1 1 1 |
| 5 | 0 0 0 0 0 1 1 1 |
| 6 | 0 0 0 0 0 0 1 1 |
| 7 | 0 0 0 0 0 0 0 1 |

METHOD OF DECODING IN RUN REPRESENTATION

BACKGROUND OF THE INVENTION

1. Field of the Invention

This invention relates to a method of decoding in run representation, and more particularly to a method of decoding in run representation for use in image processing in OCR (optical character recognition) apparatus, image communication apparatus, and image processing apparatus or the like.

2. Description of the Prior Art

Run representation is a well-known method of representing images. A run unit is defined as a unit in which black pixels or white pixels are continuously present when images are raster-scanned horizontally or vertically. Run representation is a method of representing images by the use of a run unit as a smallest unit. In run representation, images are represented in accordance with information on the run lengths or positions of run units. Run representation can advantageously represent original images with less information than the information required to represent bit patterns. Therefore, run representation has been utilized as a data compression technique.

However, run representation generally has a problem in that inordinate time is required to obtain the bit patterns of original images by decoding the run unit in which the original images are encoded. Conventionally, in the case of a FAX, this problem has been avoided by performing high-speed decoding with additional hardware. However, when only software is utilized in the decoding process, this problem previously could not be avoided.

SUMMARY OF THE INVENTION

Accordingly, one object of the present invention is to provide an improved method of decoding in run representation. This method can decode image data encoded in run representation to the original image data of bit patterns on a word unit basis at higher speed than the conventional procedures. Further, this method can achieve such high-speed decoding using only additional software.

Briefly, in accordance with one aspect of this invention, there is provided a method of decoding image data encoded in run representation to the original image data of bit patterns on the word unit basis. This method comprises the step of obtaining position information of run units within corresponding word unit. The image data encoded in run representation is represented with bit patterns derived from length information of run units obtained in the order of a scanning direction. The method further comprises the steps of retrieving word units that store bit patterns based on the thus obtained position information, and processing the thus retrieved word units with respect to each corresponding word unit. The method still comprises the step of combining the thus processed word units in the order of the corresponding word unit so as to produce the same as output word.

BRIEF DESCRIPTION OF THE DRAWINGS

A more complete appreciation of the invention and many of the attendant advantages thereof will be readily obtained by reference to the following detailed description when considered in connection with the accompanying drawings, wherein.

DESCRIPTION OF THE PREFERRED EMBODIMENTS

Referring now to the drawings, wherein like reference numerals designate identical or corresponding parts throughout the several views, and more particularly to FIG. 1 thereof, one embodiment of this invention will be described.

Figure 1:
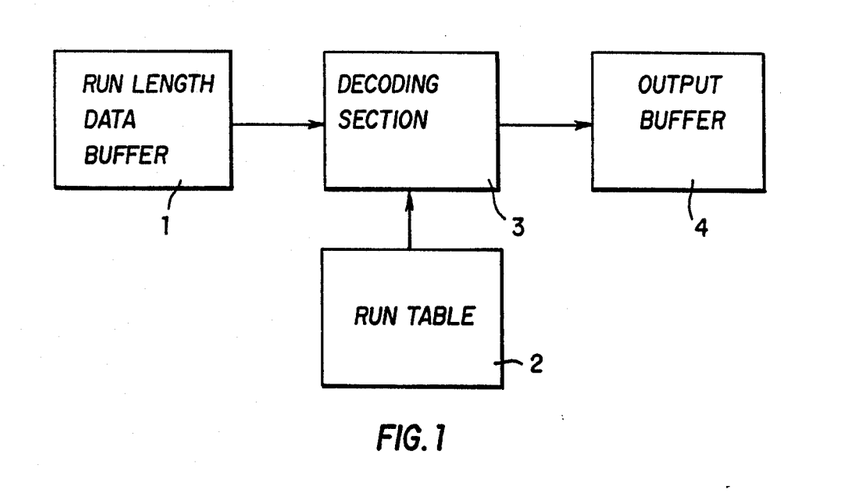
FIG. 1 is a block diagram illustrating a schematic configuration of a system for realizing a method of decoding according to embodiments of the present invention.

FIG. 1 is a block diagram explaining the outline of a method of decoding run representations according to the present invention. In FIG. 1, a series of run length codes are sequentially read out from a run length data buffer 1. These run length codes are fed into a decoding section 3, and decoded therein by use of a run table 2. The thus decoded outputs are fed into an output buffer 4.

Figure 2:
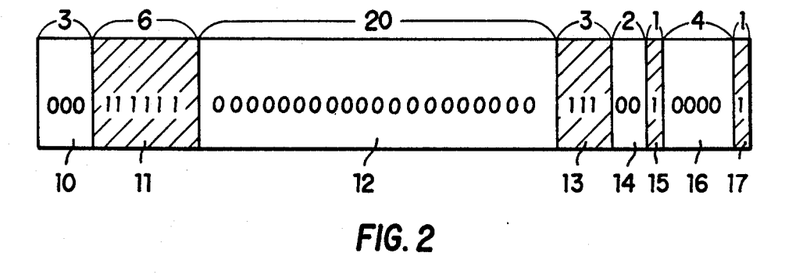
FIG. 2 is a diagram illustrating an example of configuration of run length codes to be decoded in the embodiments of the present invention.

FIG. 2 is a schematic configuration of a series of run length codes 10 through 17 corresponding to one single line of an image to be decoded by a method according to the present invention. Specifically, the respective run length codes 10, 12, 14 and 16, which are blank portions, represent white pixels. Further, the respective run length codes 11, 13, 15 and 17, which are hatched portions, represent black pixels. The numbers on the upper sides of the respective run length codes 10 through 17 indicate how many white or black pixels are continuously present therein. In actual run length representation, these are expressed as follows;

white 3, black 6, white 20, black 3,
white 2, black 1, white 4, and black 1.

Figure 3:
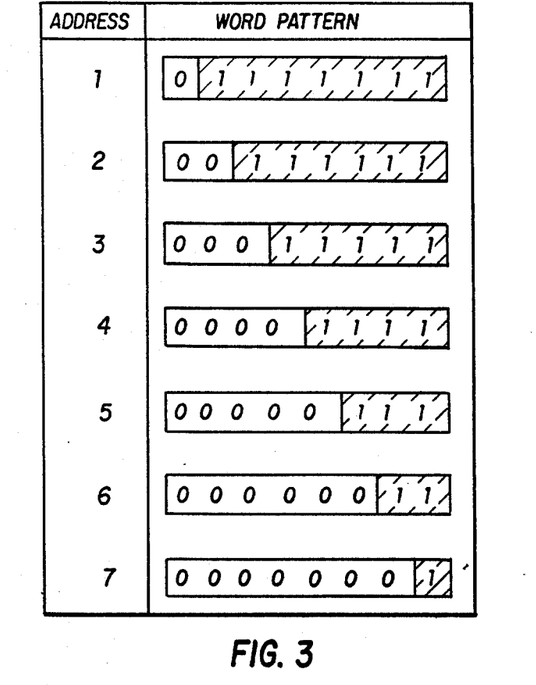
FIG. 3 is a diagram illustrating an example of a schematic configuration of a one-dimensional run table for use in a first embodiment of the present invention.

In the present invention, a run table is used for converting the run length codes into the original image data. The run length codes are represented by bit units, while the original image data are represented by word units each of which includes 8 bits. The run table may be incorporated in a ROM (read-only-memory). FIG. 3 shows a configuration of a one-dimentional run table for use in a first embodiment of the present invention. In the run table, the word patterns of the respective words are stored. In the word patterns, the starting points of black pixels in the respective words are changed in steps. Namely, the bit patterns of the image to be obtained by decoding the run length codes are stored on a word-by-word basis. The respective word patterns are given specified address numbers.

Figure 4:
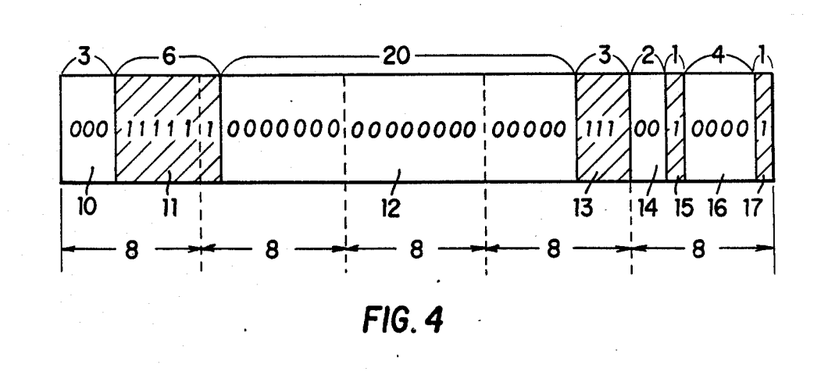
FIG. 4 is a diagram illustrating the respective end of each word unit when the run length codes of FIG. 2 are used in the embodiments of the present invention.

The run length codes to be decoded, shown in FIG. 2, are expressed by bit units. However, in the following description, these run length codes are partitioned by word units so as to be processed. FIG. 4 shows this relationship; namely, the run length codes of FIG. 2 are partitioned by a word unit of 8 bits, as indicated by the dotted lines.

Figure 5:
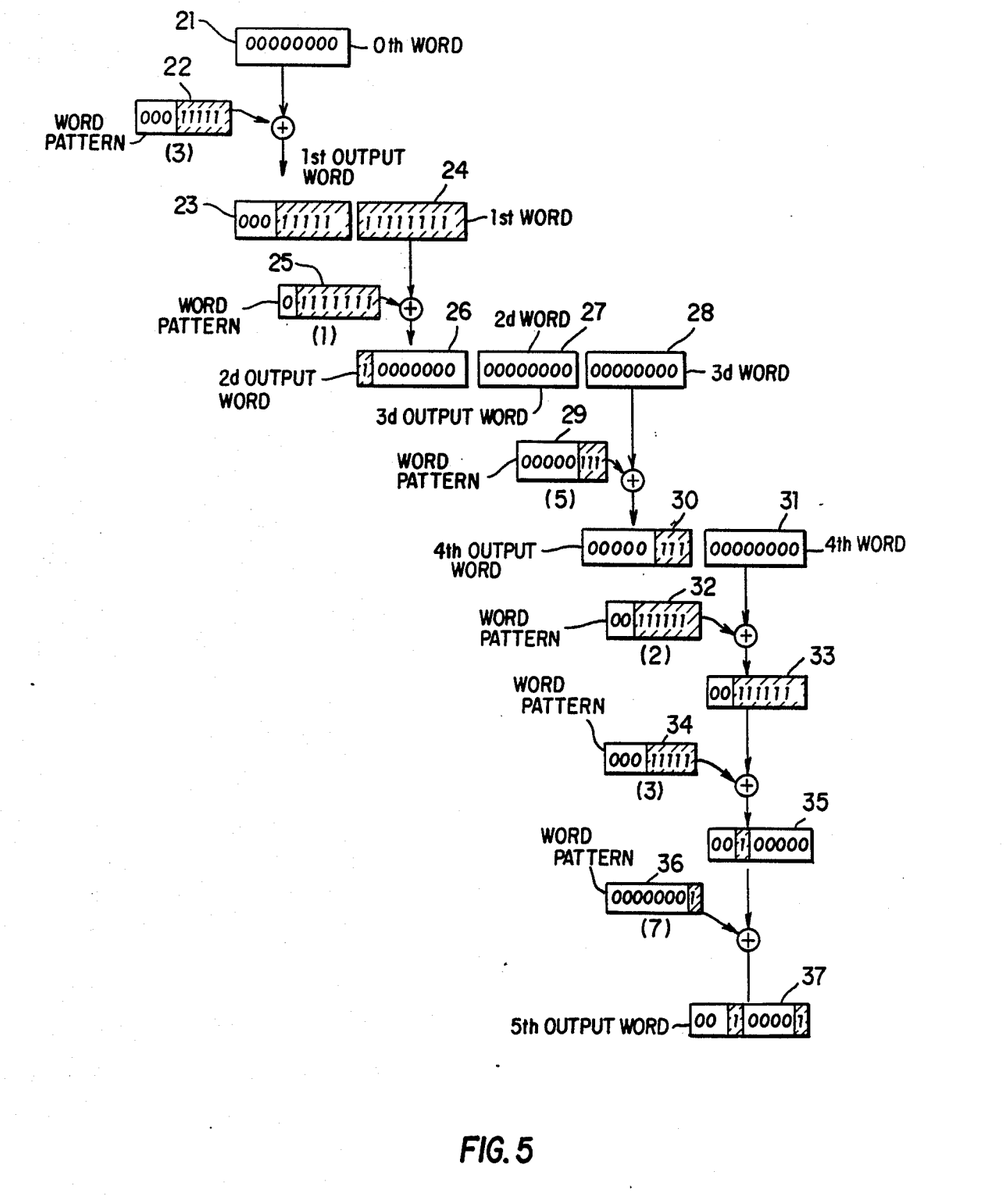
FIG. 5 is a block diagram illustrating the steps of processing for decoding in the first embodiment of the present invention.

FIG. 5 is a block diagram illustrating the steps of processing in decoding the run length codes according to the first embodiment of the present invention. Hereinafter, a method of decoding according to the first embodiment of the present invention will be described with reference to FIGS. 1 through 5. In FIG. 1, the decoding section 3 receives run length codes which are constituted by bit units. The addresses within the run table of FIG. 3, which correspond to these run length codes can be calculated by the following equation.

$$\text{address} = \left(\begin{array}{c}\text{accumulated value}\\ \text{of run lengths}\end{array}\right) - \left(\begin{array}{c}\text{converted}\\ \text{word numbers}\end{array}\right) \times 8 \quad (1)$$

In FIG. 4, a run length code 10, which is the head of a series of run length codes 10 through 17, is constituted by white pixels. Thus, the 0th word 21 of FIG. 5, which corresponds to the run length code 10 and a part of run length code 11, is designated as 0 that represents white. Next, an image word pattern corresponding to this run length code 10 is obtained from the run table of FIG. 3 in the following manner. Specifically, an address is obtained by use of the equation (1); address=3−0×8=3. In accordance with this address (3), an image word pattern 22 is obtained from the run table of FIG. 3. The 0th word 21 is processed by logical Exclusive-OR with respect to the thus obtained image word pattern 22. As a result, a first output word 23 is obtained. Here, the sum of the bit numbers of the run length code 10 and the run length code 11, which is subsequently processed, is 9 bits. This number of 9 bits is greater than 8 bits (=1 word). Thus, the processing of the 0th word 21 ends.

Next, the first word 24 of FIG. 5 is designated as 1 that represents black. This is because the remaining bit of the second run length code 11 is black as shown in FIG. 4. In other words, the end of the preceding word in terms of run state continues to the following word. Thereafter, an image word pattern corresponding to the run length code 11 is obtained in the following manner. Specifically, first, an address is obtained by use of the equation (1); address=9−1×8=1. According to the address (1) within the run table of FIG. 3, an image word pattern 25 is obtained. The first word 24 is processed by logical Exclusive-OR with respect to the thus obtained word pattern 25. As a result, a second output word 26 is obtained. This is the end of processing of the first word 24.

Next, a second word 27 of FIG. 5 is designated as 0 that represents white. Because the head of the second word of FIG. 4 is white. However, in FIG. 4, the sum of the 8 bits in the second word and the 5 bits in the third word is 13 bits. This number of 13 bits is greater than 8 bits (=1 word). Thus, the processing of the second word 27 ends. Namely, the second word 27 remains as a third output. Next, a third word 28 of FIG. 5 is designated as 0 that represents white. This is because the head of the third word of FIG. 4 is white. Thereafter, an image word pattern corresponding to the run length code 12 is obtained in the following manner. Specifically, an address is obtained by use of the equation (1); address=29−3×8=5. In accordance with the address (5), an image word pattern 29 is obtained from the run table of FIG. 3. Then the third word 28 is processed by logical Exclusive-OR with respect to the thus obtained image word pattern 29. As a result, a fourth output word 30 is obtained.

Next, a fourth word 31 of FIG. 5 is designated as 0 that represents white. Primarily, this should be 1. However, as shown in FIG. 4, the end of the run length code 13 coincides with the end of the third word. Thus, the fourth word 31 of FIG. 5 is designated as O instead. Thereafter, an image word pattern corresponding to the run length code 13 is obtained in the following manner. Specifically, an address is obtained by use of the equation (1); address=32−4×8=0. However, in this case, (O) means that there is no image word pattern in the run table of FIG. 3. Therefore, an image word pattern corresponding to the subsequent run length code 14 is obtained by use of the equation (1); address=34−4×8=2. In accordance with this address (2), an image word pattern 32 is obtained from the run table of FIG. 3. The fourth word 31 is processed by logical Exclusive-OR with respect to the thus obtained word pattern 32.

As a result, an output word 33 is obtained. However, within the fourth word of FIG. 4, there still exist other ends of run length codes 15 and 16. Thus, the procedure in this case is not completed. Therefore, the following procedures are required. Specifically, an image word pattern corresponding to the subsequent run length code 15 is obtained in the following manner. An address is first obtained by use of the equation (1); address=35−4×8=3. In accordance with this address (3), an image word pattern 34 is obtained from the run table of FIG. 3. Thereafter, the output word 33 is processed by logical Exclusive-OR with respect to the thus obtained word pattern 34. As a result, an output word 35 is obtained. Similarly, in this case, there still exists the other end of run length code 16 within the fourth word of FIG. 4. Thus, the procedure is not completed.

Therefore, the following procedures are required. Specifically, an image word pattern corresponding to the subsequent run length code 16 is obtained in the following manner. An address is first obtained by use of the equation (1); address=39−4×8=7. In accordance with this address (7), an image word pattern 36 is obtained from the run table of FIG. 3. Thereafter, the output word 35 is processed by logical Exclusive-OR with respect to the thus obtained word pattern 36. As a result, a fifth output word 37 is obtained. Then, the first output word through the fifth output word, which are obtained in the above-described manner, are combined in the output buffer 4. Consequently, a series of run length codes is decoded into the original image data.

Figure 6:
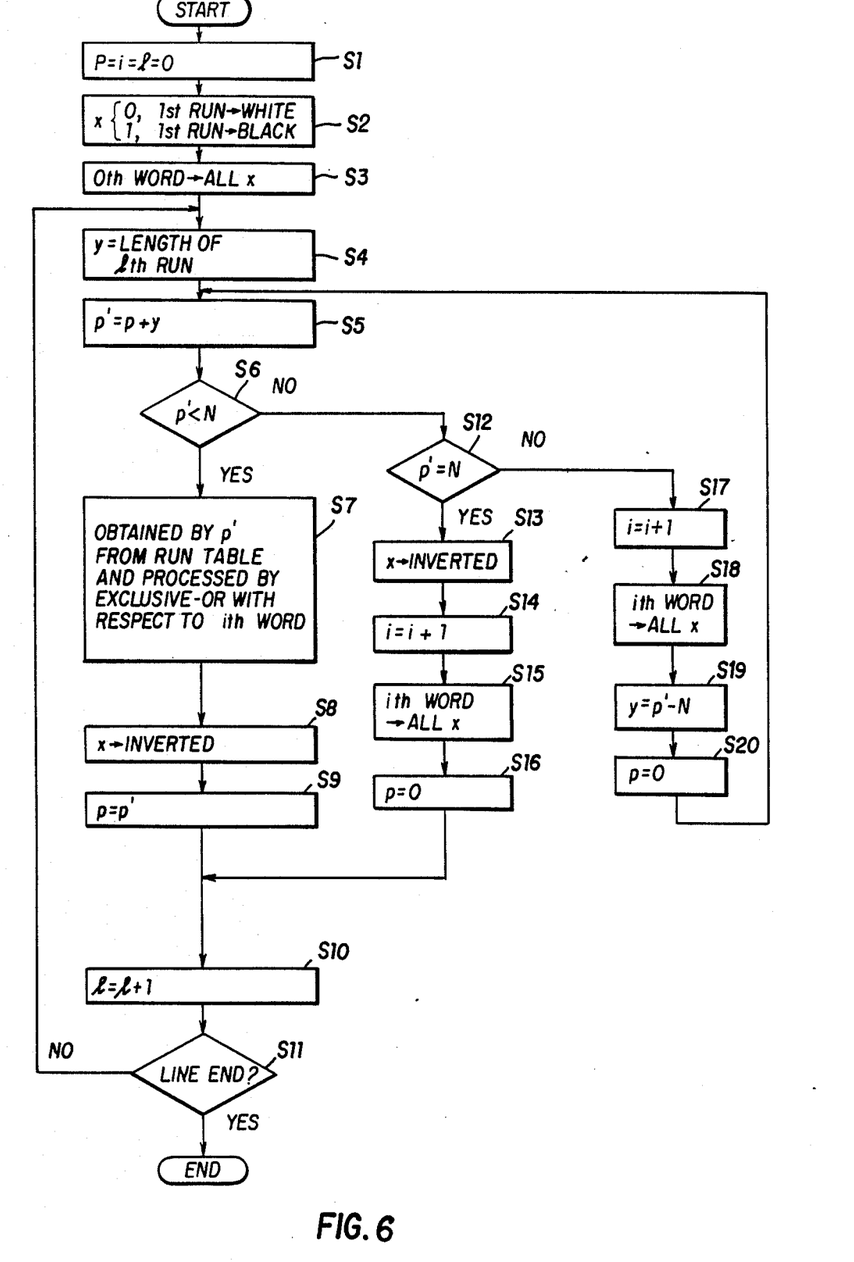
FIG. 6 is a flow chart illustrating a method of decoding in the first embodiment of the present invention.

FIG. 6 is a flow chart illustrating a method of decoding according to the first embodiment.

Figure 7:
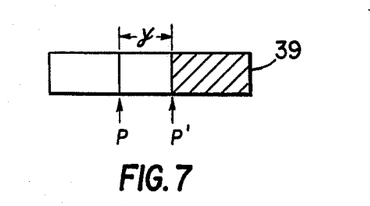
FIG. 7 is a diagram illustrating a word configuration for use in the first embodiment of the present invention.

In this flow chart, variables used are such that N represents a word length, (N=8); p represents the bit number at the end of a run length code, and p' represents the bit number at the end of a word; y represents a run length, i.e., bit number; x is a white/black flag that represents kinds of a run, namely, white or black using 0 or; i represents the position (the order of integration) of the output word; and l represents the order of (i.e., the positions of) the respective run length codes in a series of run length codes. FIG. 4 shows a series of run length codes to be processed in accordance with this flow chart. In this flow chart, a word 39 of FIG. 7 is used.

The series of run length codes shown in FIG. 2 begins with white. Thus, x=0 (step S2) and p=i=l=0 (step S1).

First, all the bits within the 0th word are reset by x (x=0) (step S3). The number 3 which is the run length of the lth run (the 0th run length code 10 of FIG. 2) is substituted into y (step S4). An image word pattern 22 of FIG. 5 is obtained from the run table of FIG. 3 in accordance with the address derived from the result of $p+y=3$ (step S5). Here, p'>8 (step S6). The 0th word is processed by logical Exclusive-OR with respect to the thus obtained image word pattern 22. As a result, a first output word 23 of FIG. 5 is obtained (step S7). Next, $p'=p+y$ is obtained. Specifically, p'=3, and x is inverted to 1 (step S7).

Next, the procedure causes l to be $l=l+1$ (step S10). Then the number 6 which is the run length of the lth run (the first run length code 11 of FIG. 2) is substituted into y (step S4). However, in this case, p+y>8 (steps 56 and S12). Thus, the processing of the 0th word ends. Next, the procedure causes i to be $i=i+1$ (step S17), and advances to the processing of the first word of FIG. 4. The first word is reset by 1 (step S18) and becomes a first word 24 of FIG. 5. Here, $y=(-p+y)-N=(3+6)-8=1$ (step S19). Thus, the procedure causes y to be 1, and also causes p to be 0 (step 520).

An image word pattern 25 of FIG. 5 is obtained from the run table of FIG. 3 in accordance with the address derived from the result of $p+y=1$. The 0th word is processed by logical Exclusive-OR with respect to the thus obtained image word pattern 25. As a result, a second output word 26 of FIG. 5 is obtained. Here, p' becomes $p'=p+y=1$ (step S5), and x is inverted to 0 (step 513). Next, the procedure causes l to be $l=l+1$ (step S10), and advances to the processing of the second run length code 12 of FIG. 2.

The number 20, which is the run length of the second run length code 12, is substituted into y (step S4). Here, p+y>8 (steps 56 and S12). Thus, the processing of the first word ends. Next, the procedure causes i to be $i=i+1$ (step S17), advances to the processing of the second word of FIG. 4. The second word is reset by x (x=0) (step S18), and becomes a second word 27 of FIG. 5. Here, $y=(p+y)-N=(1+20)-8=13$ (step S19). Thus, the procedure causes p to be 0 (step S20). However, in this case, the condition in which p+y>8 is still satisfied (steps S6 and S12). Thus, the processing of the ith word (the second word 27 of FIG. 5) ends.

Next, the procedure causes i to be $i=i+1$ (step S17), and advances to the processing of the third word of FIG. 4. The third word is reset by x (x=0) (step S18), becomes a third word 28 of FIG. 5. Here, $y=(-p+y)-N=(0+13)-8=5$ (step S19). Thus, the procedure causes p to be 0 (step S20). Now, p+y>8 (step S6). Therefore, an image word pattern 29 of FIG. 5 is obtained from the run table of FIG. 3 in accordance with the address derived from the result of $p+y=5$. Next, the third word 28 of FIG. 5 is processed by logical Exclusive-OR with respect to the thus obtained image word pattern 29 (step S7). As a result, a fourth output word 30 of FIG. 5 is obtained. Here, p' becomes $p'=p+y=5$, and x is inverted to 1 (step S8). Next, the procedure causes l to be $l=l+1$ (step S10), and advances to the processing of the third run length code 13 of FIG. 2.

The run length of the third run length code 13 is 3. Thus, $p+y=8$ (step S12). Therefore, the processing of the third word ends. The procedure causes x to be inverted to 0 (step S13), and causes i to be $i=i+1$ (step S14). Then the procedure advances to the processing of the fourth word of FIG. 4. The fourth word is reset by 0 (step S15), and becomes a fourth word 31 of FIG. 5. The procedure causes p to 0 (step S16). Further, the procedure causes l to be $l=l+1$ (step S10); and advances to the processing of the fourth run length code 14 of FIG. 2.

The number 2, which is the run length of the fourth run length code 14, is substituted into y (step S4). An image word pattern 32 of FIG. 5 is obtained from the run table of FIG. 3 in accordance with the address derived from the result of $p+y=2$. The fourth word 31 of FIG. 5 is processed by logical Exclusive-OR with respect to the thus obtained image word pattern 32. As a result, an output word 33 of FIG. 5 is obtained (step S7). The procedure causes p' to be $p'=p+y=2$ and advances to the processing of the fifth run length code 15 of FIG. 2.

The number 1, which is the run length of the fifth run length code 15, is substituted y into (step S4). An image word pattern 34 of FIG. 5 is obtained from the run table of FIG. 3 in accordance with the address derived from the result of $p+y=3$. The output word 33 of FIG. 5 is processed by logical Exclusive-OR with respect to the thus obtained image word pattern 34 (step S7). As a result, an output word 35 of FIG. 5 is obtained. Next, the procedure causes p' to be $p'=p+y=3$, and advances to the processing of the sixth run length code 16 of FIG. 2.

The number 4, which is the run length of the sixth run length code 16, is assigned to y (step S4). An image word pattern 36 of FIG. 5 is obtained from the run table of FIG. 3 in accordance with the address derived from the result of $p+y=5$. The output word 35 of FIG. 5 is processed by logical Exclusive-OR with respect to the thus obtained image word pattern 36. As a result, a fifth output word 37 of FIG. 5 is obtained (step S7). The procedure causes P' to be $p'=p+y=7$, and advances to the processing of the seventh run length code 17 of FIG. 2. The number (1), which is the run length of the seventh run length code 17, is assigned to y (step S4). Then, $p+y=8$. Therefore, the processing of the fourth word of FIG. 4 ends. Now, the procedure ends the processing of the amount of one single line (step S11). Consequently, the output words 23, 26, 27, 30 and 37 of FIG. 5 are obtained as decoded output words.

Figure 8:
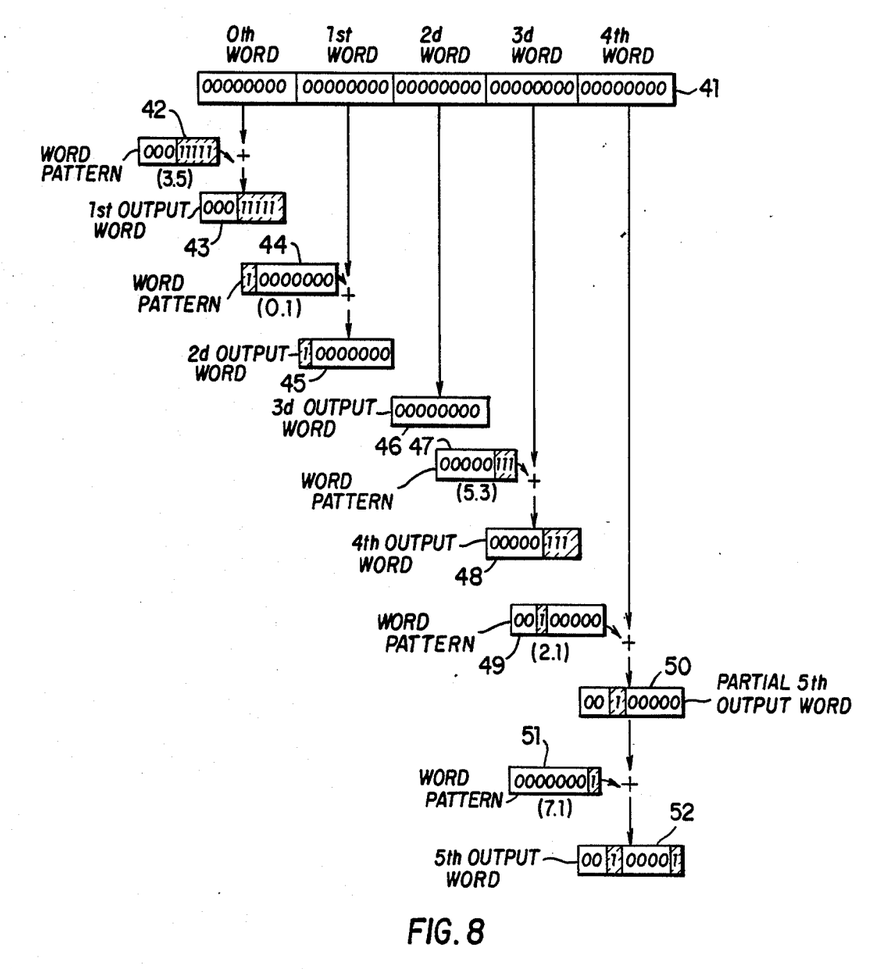
FIG. 8 is a block diagram illustrating the steps of processing for decoding in a second embodiment of the present invention.
Figure 9:
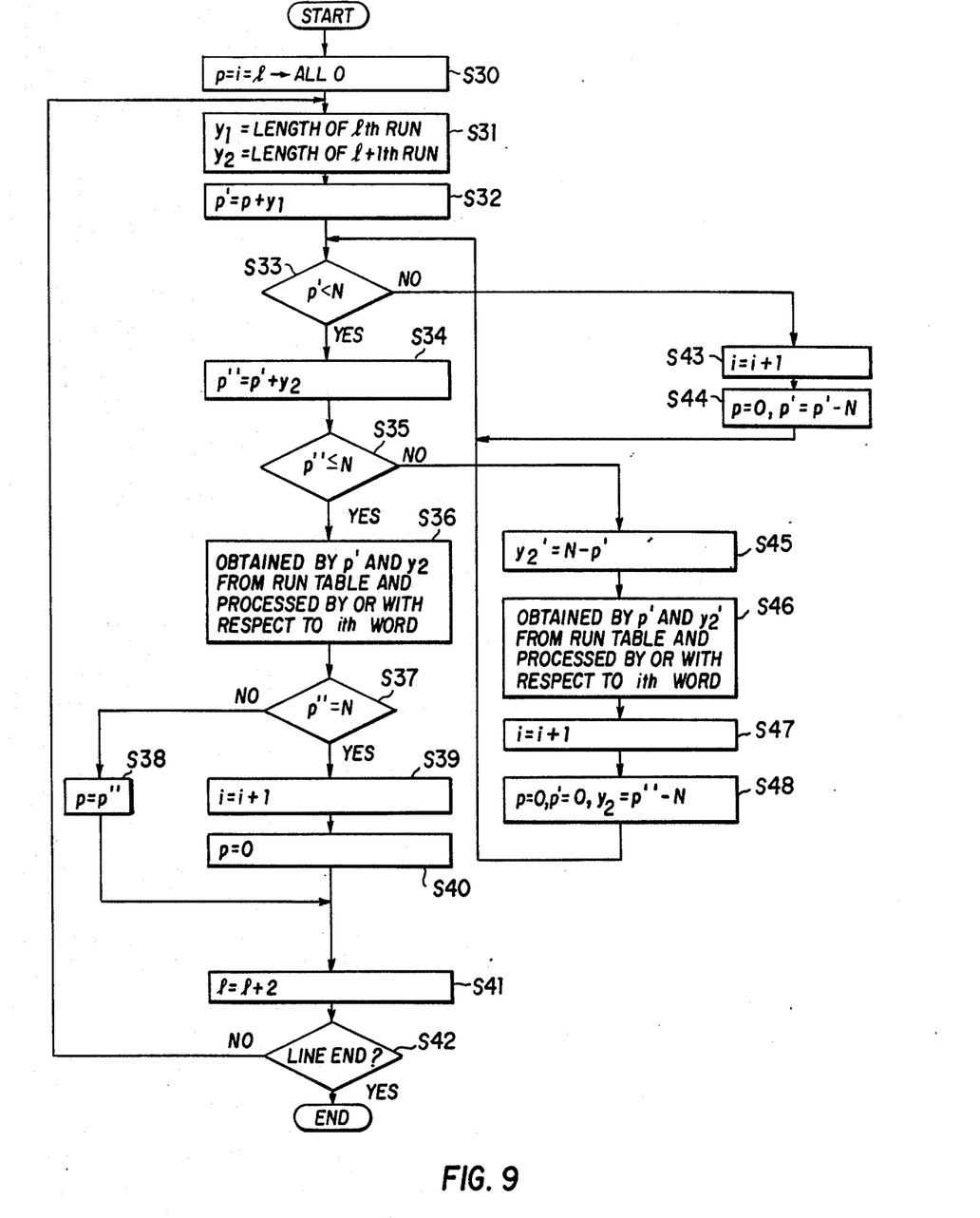
FIG. 9 is a flow chart illustrating a method of decoding in the second embodiment of the present invention.
Figure 10:
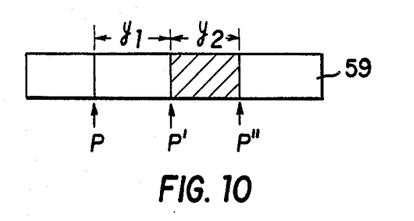
FIG. 10 is a diagram illustrating a word configuration for use in the second of the present invention.
Figure 11:
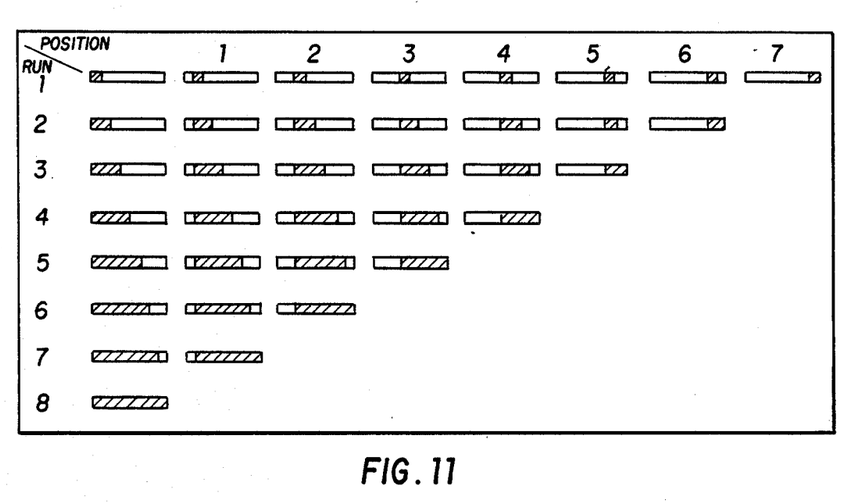
FIG. 11 is a diagram illustrating a configuration of a two-dimensional run table for use in the second embodiment of the present invention.

Hereinafter, a second embodiment of the present invention will be described. In this embodiment, the decoding of run length codes is performed by the use of a two-dimensional run table and by logical OR processing. FIG. 8 is block diagram illustrating the steps of processing of decoding according to the second embodiment of the present invention. FIG. 9 is a flow chart illustrating the procedures of decoding. FIG. 10 is a diagram illustrating the shape of word used in this embodiment. FIG. 11 is a two-dimensional run table used in this embodiment. The procedures of decoding run length codes will be described with reference to the flow chart of FIG. 9. In this flow chart, variables used are such that p,p' and p" represent positions; $y_1$ and $y_2$ represents run lengths; i represents output words; and l represents run positions. The run length codes to be decoded are shown in FIG. 2. First, $p=i=l=0$ (step S30). Then, a 0th word through a fourth word 41 are all reset to 0 as shown in FIG. 8. Next, the numbers (3) and (6), which are respectively run lengths of the 0th run length code 10 and the first run length code 11 of FIG. 2, are assigned to $y_1$ and $y_2$ (step S31). Then, $p'=p+y_1=3$ (step S32) and $p''=p'+y_2=9$ (step S34), respectively. However, $p''>8$ (step S35). Thus, $y_2'=8-p'=5$ (step S45). As a result, position=3 and run=5 are obtained. Next, an image word pattern 42 is obtained from the two-dimensional run table of FIG. 11 in accordance with the thus obtained numbers (3) and (5) indicative of the position and run in the run table of FIG. 11. Thereafter, the 0th word is processed by logical OR with respect to the thus obtained image word pattern 42. As a result, a first output word 43 is obtained (step S46). Next, the procedure causes i to be $i=i+1$ (step S47), and advances to the processing of the first word of FIG. 8. Here, p, p' and $y_2$ are respectively changed to $p=0$, $p'=0$ and $y_2=p''-8=1$ (step S48). Then, an image word pattern 44 is obtained from the run table of FIG. 11 in accordance with the numbers 0 and 1 (p' and $y_2$). The first word of FIG. 8 is processed by logical OR with respect to the thus obtained image word pattern 44. As a result, an output word 45 of FIG. 8 is obtained (step S36). Next, the procedure causes p to be $p=p''=p'+y_2=1$ (step S38), l to be $l=l+2$ (step S41), and advances to the following processing. Specifically, the numbers 20 and 3, which are run lengths of the second run length code 12 and the third run length code 13 of FIG. 2, are respectively assigned to $y_1$ and $y_2$; ($y_1=20$, $y_2=3$) (step S31). Here, $p'=p+y_1=21$ (step S32), i. e., $p'>8$ (step S33). Thus, the processing of the first word of FIG. 8 ends. Next, the procedure causes p and p" to be $p=0$ and $p''=p'-8=13$ (step S43) and advances to the processing of the second word ($i=i+1$) (step S44) of FIG. 8. However, in this case, the state of p' still remains $p'>8$. Thus, the processing of the second word ends without any change; (46 of FIG. 8). Next, the procedure causes p and p' to be $p=0$ and $p'=p''-8=5$ (step S44), and advances to the processing of the third word ($i=i+1$) (step S43) of FIG. 8. Since $p''=p'+y_2=5+3=8$, the numbers (5) and (3) are obtained respectively as a position $p'=5$ and a run $y_2=3$. Then, an image word pattern 47 of FIG. 8 is obtained from the run table of FIG. 11 in accordance with the numbers 5 and 3 (p' and $y_2$). Next, the third word is processed by logical OR with respect to the thus obtained image word-pattern 47. As a result, a fourth output word 48 of FIG. 8 is obtained (step S36). Next, the procedure confirms $p''=8$ (step S37), then advances to the processing of the fourth word ($i=i+1$) (step S39) of FIG. 8. Then, the procedure causes p and l to be $p=0$ (step S40) and $l=l+2$ (step S41), and advances to the following processing.

Next, the numbers 2 and 1, which are run lengths of the fourth run length code 14 and the fifth run length code 15 of FIG. 2, are respectively assigned to $y_1$ and $y_2$ ($y_1=2$ and $y_2=1$) (step S31). Here, the states of p' and p" are such that $p'=p+y_1=2$ and $p''=p'+y_2=3$. Thus, position $p'=2$ and run $y_2=1$. Then, an image word pattern 49 of FIG. 8 is obtained from the run table of FIG. 11 in accordance with the numbers 2 and 1, ($p'=2$ and $y_2=1$). Next, the fourth word of FIG. 8 is processed by logical OR with respect to the thus obtained image word pattern 49. As a result, a partial fifth output word 50 is obtained (step S36). Next, the procedure causes P and l to be $p=p''=3$ (step S40) and $l=l=+2$ (step S41), and advances to the following processing.

The numbers (4) and (1), which are run lengths of the sixth run length code 16 and the seventh run length code 17 of FIG. 2, are respectively substituted to $y_1$ and $y_2$ ($y_1=4$ and $y_2=1$) (step S31). Here, the states of p" and y" are such that $p''=p+y_1=3+4=7$ and $y''=p'+y_2=8$. Thus, position $p'=7$ and run $y_2=1$ are obtained. Next, an image word pattern 51 of FIG. 8 is obtained from the run table of FIG. 11 in accordance with the numbers 7 and 1 indicative of the position and run. Then, the fourth word of FIG. 8 is processed by logical OR with respect to the thus obtained image word pattern 51. As a result, a fifth output word of FIG. 8 is obtained (step S36). Since $p''=8$ (step S37), the processing of the fourth word ends. Here, because of $l=l+2$ (step S41), the processing of the amount of one single line is completed (step S42).

Then, the thus obtained output words 43, 45, 46, 48 and 52 are combined in the output buffer 4 of FIG. 1. Consequently, the series of run length codes of FIG. 2 are completely decoded.

Figure 12:
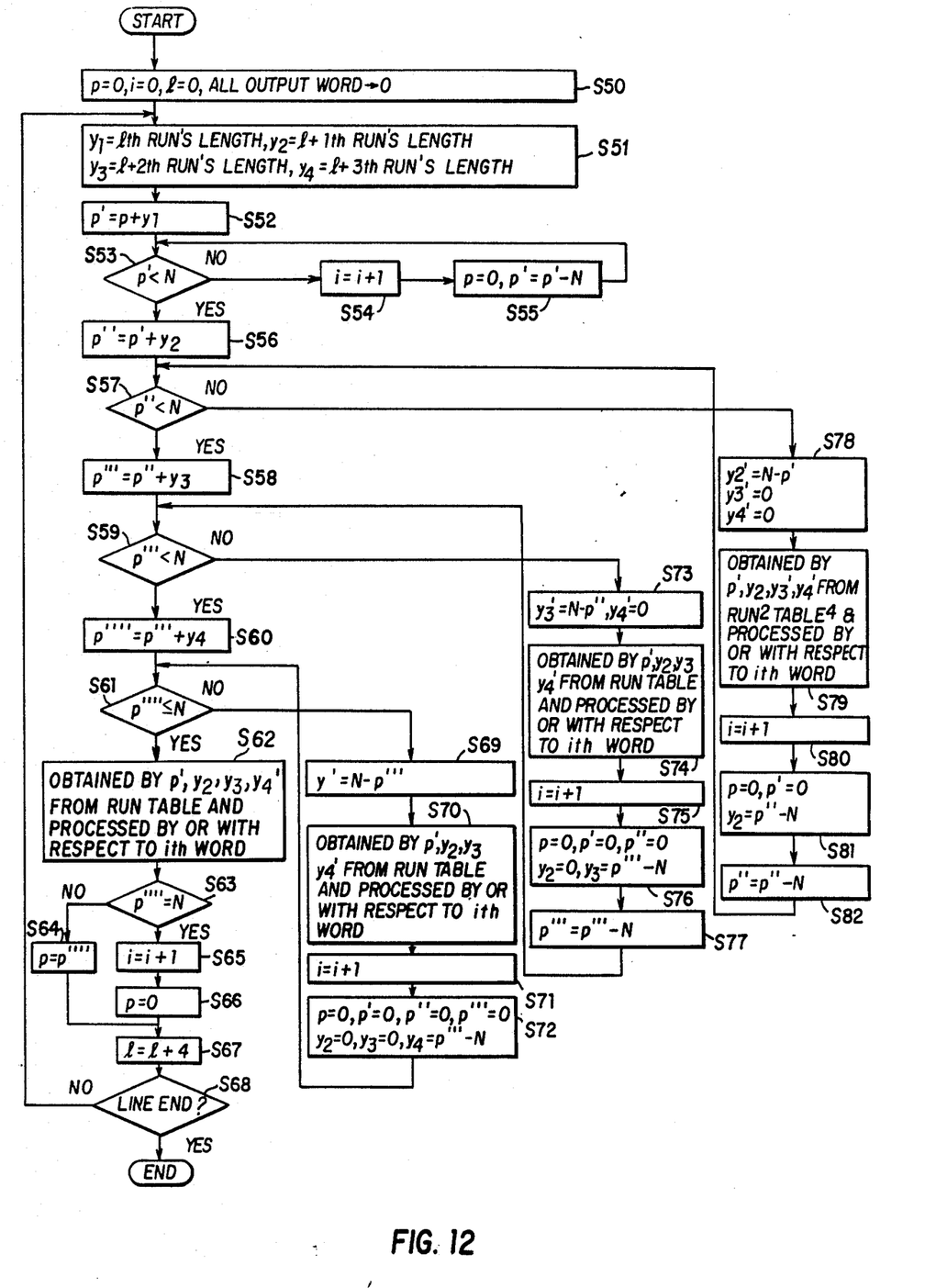
FIG. 12 is a flow chart illustrating a method of decoding in a third embodiment of the present invention.
Figure 13:
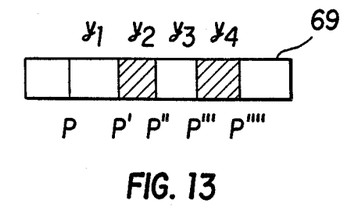
FIG. 13 is a diagram illustrating a word configuration for use in the third embodiment of the present invention.

FIG. 12 is a flow chart illustrating the steps of processing in a third embodiment by use of run tables arranged in a four-dimensional system. In this case, the word configuration of contents in the run tables is shown in FIG. 13 with a reference numeral 69. The run tables are addressed by use of variables such as p', $y_2$, $y_3$ and $y_4$.

Figure 14:
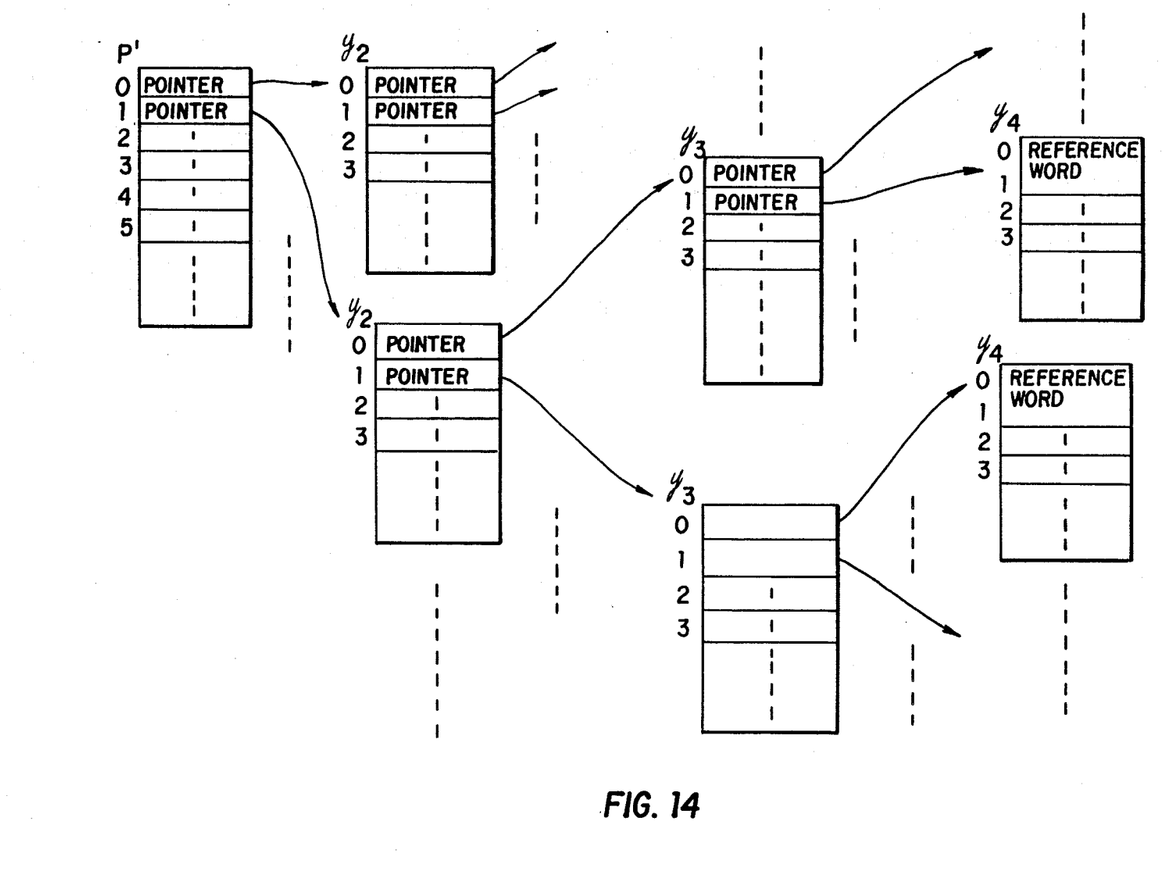
FIG. 14 is a diagram illustrating a multi-dimensional table for use in the third embodiment of the present invention.

In the case of a multi-dimensional run tables, a high speed access can be achieved by use of a chained tree structure shown in FIG. 14.

In the present invention, the number of dimensions of a run table may be one or more, and processings may be executed either by logical OR or by Exclusive-OR. Further, the above-described flow charts are only examples of processing, and these flow charts may be modified in accordance with the invention. For example, in FIG. 3, the flow chart may be modified such that under the condition of $p'=N$, words with all 0 are applied to the run table so as to be stored therein on the basis of $p'=8$. These words may be properly modified to be processed by logical Exclusive-OR. This modification does not deviate from the concept of the invention. Moreover, even in the case of so-called compressed information in which runs are coded, the present invention can be utilized when the coded runs are properly decoded. Naturally, representation of black and white within a computer is not limited to the above-described embodiments. The starting run in the run representation may also be either white or black. In addition, the processing may be achieved either by software or by hardware. In FIG. 2, illustration is made by the run length representations such as 3, 6, 20, 3, 2, 1, 4 and 1. However, these may also be the coordinate representations such as 3, 9, 29, 32, 34, 39 and 40. In short, whatever the type of run representation may be, it does not deviate from the concept of this invention.

As described above, according to the present invention, the procedures in which image data of run representation are decoded to bit patterns can be performed significantly faster than with conventional procedures. Specifically, the decoding procedures are executed upon occurrence of each run on the input side. While at the same time, the decoding procedures are executed upon occurrence of each word on the output side. Thus, the decoding speed becomes significantly higher than that in the conventional procedure in which outputs are produced upon occurrence of each bit.

What is claimed is:

1. A method of decoding word units of image data in run representation including position information or length information into bit pattern data corresponding to an original image, comprising the steps of:
   retrieving in response to the position information or length information at least one predetermined word pattern containing a plurality of bits arranged in a predetermined bit pattern from a plurality of stored word patterns, each having a different predetermined bit pattern; and
   processing each retrieved word pattern into bit pattern data corresponding to a word unit portion of the original image.

2. The method of claim 1 also including the step of combining the processed bit pattern data in a prescribed order to form bit pattern data corresponding to the entire original image.

3. The method of claim 1, wherein the step of retrieving each word pattern includes the substep of reading the word pattern from a memory in response to the position information or length information, said word pattern including black and white bit pattern information.

4. The method of claim 1, wherein the step of processing each retrieved word pattern includes the substep of subjecting the retrieved word pattern to Exclusive-OR logic processing with a word unit of the image data.

5. The method of claim 1, wherein the step of processing each retrieved word pattern includes the substep of subjecting the retrieved word pattern to Exclusive-OR logic processing with respect to a corresponding bit pattern data storing all white bits or all black bits in accordance with a run length of a first run unit or a run length of the last run unit within a word unit of the image data immediately before a current word unit in the order of a scanning direction.

6. A method of decoding word units of image data encoded in run representation into the original data of bit patterns on a word unit basis, said method comprising the steps of:
   obtaining existence position information of particular run units among plural run units within a corresponding word unit of the image data, said image data encoded in run representation being represented with bit patterns derived from information on the run lengths of plural adjacent run units in the order of a scanning direction with respect to said image data;
   retrieving word patterns storing therein bit patterns based on the thus obtained existence position information;
   processing the retrieved word patterns with respect to each corresponding word unit of image data; and
   combining the thus processed word units in the order of the corresponding word unit of image data to produce output words.

7. The method of claim 6, wherein the step of retrieving the word patterns includes the substep of reading a specified word pattern from a memory in response to the existence position information, said specified word pattern corresponding to the existence position information, said word pattern including a predetermined bit pattern corresponding to the existence position information of the particular run unit.

8. The method of claim 7, further comprising the steps of limiting a number of adjacent run units to two, and limiting the particular run unit to a black run unit of these two.

9. The method of claim 7, further comprising the steps of limiting the existence position information to position information indicative of a position at which a series of successure black colored bits begins first within a corresponding word unit and length information indicative of the number of successive black bits starting from said position.

10. The method of claim 8, wherein the step of processing includes the substep of subjecting each retrieved word pattern to OR logic processing.

11. The method of claim 7, further comprising the steps of limiting a number of adjacent runs to four, and limiting the particular run units to, successively, a first black run unit, a subsequent white run unit, and a still subsequent black run unit.

12. The method of claim 11, further comprising the step of limiting the existence position information of the particular run unit to position information indicative of a position at which a black run unit starts first within the corresponding word units of image data and length information indicative of lengths being occupied respectively by a black run unit starting from said position, a subsequent white run unit, and a still subsequent black run unit within the corresponding word unit.

13. The method of claim 12, wherein the step of retrieving the word patterns includes the substep of reading position information indicative of a position at which a black run unit starts first within the corresponding word unit of the image data, length information indicative of a length being occupied by a black run unit starting from said position, length information indicative of a length being occupied by a subsequent white run unit, and length information indicative of a length being occupied by a still subsequent black run unit from a multi-dimensional table based on a chained tree structure.

14. A method of decoding words of image data stored in run representation to output bit pattern data corresponding to an original image, said image data including position information and length information, the method comprising the steps of:
   reading an image data word into an image buffer;
   retrieving, in response to at least one of the position information or the length information of the read image word, a word pattern having a plurality of bits arranged in a predetermined bit pattern from a plurality of word patterns, each word pattern having a different bit pattern; and
   exclusive ORing the retrieved word pattern with an all black or all white bit pattern corresponding to a word of the original image.

* * * * *